United States Patent Office 3,781,433
Patented Dec. 25, 1973

3,781,433
PIPERAZINYL-SUBSTITUTED-TRICYCLIC
COMPOUNDS AS TRANQUILLIZERS
Eugene E. Galantay, Morristown, N.J., assignor to
Sandoz-Wander, Inc., Hanover, N.J.
No Drawing. Application Jan. 18, 1971, Ser. No. 107,521,
now Patent No. 3,692,788, dated Sept. 19 1972, which
is a continuation-in-part of abandoned application Ser.
No. 795,048, Jan. 29, 1969. Divided and this application July 13, 1972, Ser. No. 271,491
Int. Cl. A61k 27/00
U.S. Cl. 424—250                           23 Claims

ABSTRACT OF THE DISCLOSURE

The compounds are 2-alkyl-4-(4'-substituted-1'-piperazinyl)-9,10-dihydro - 4H - benzo[5,6]cyclohepta[1,2-d]oxazoles and thiazoles; the substituents being methyl, ethyl or 2-hydroxyethyl, e.g. 2-methyl-4-(4'-methyl-1'-piperazinyl) - 9,10 - dihydro - 4H-benzo[5,6]cyclohepta-[1,2-d]oxazole. The compounds are useful therapeutically.

---

This is a division of application Ser. No. 107,521 filed Jan. 18, 1971 (now U.S. Pat. 3,692,788), which in turn is a continuation-in-part of copending application Ser. No. 795,048 filed Jan. 29, 1969 (now abandoned).

This invention relates to tricyclic compounds and more particularly to 2-alkyl-4-(4'-substituted-1'-piperazinyl)-9,10 - dihydro-4H-benzo[5,6]-cyclohepta[1,2-d]oxazoles and thiazoles and to non-toxic pharmaceutically acceptable acid addition salts thereof, to methods for the preparation of said compounds as well as to therapeutic compositions containing said compounds, as active ingredients thereof, and to the use of said compositions. The invention also relates to intermediates in the preparation of said compounds, and to processes for preparing said intermediates.

The 2-alkyl - 4 - (4'-substituted-1'-piperazinyl)-9,10-dihydro - 4H - benzo[5,6]cyclohepta[1,2-d]oxazoles and thiazoles of this invention may be conveniently represented by the structural Formula I:

(I)
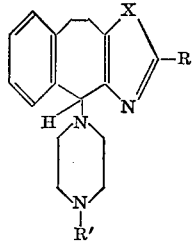

wherein
X is either oxygen or sulfur;
R is lower alkyl, e.g. having from 1 to 4 carbon atoms such as methyl, ethyl, propyl or butyl; and
R' is alkyl having from 1 to 2 carbon atoms which may be unsubstituted or ω-hydroxy-substituted when having two carbon atoms, i.e. methyl, ethyl or 2-hydroxyethyl.

Compounds I may be obtained by a procedure involving a sequence of reactions which are conveniently represented by the following reaction scheme wherein R, R' and X are as defined above, and Z is a halogen having an atomic weight of from 35 to 80, i.e. a chlorine or bromine atom.

Reaction Scheme

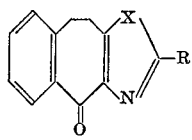
II

Step A, Reduction

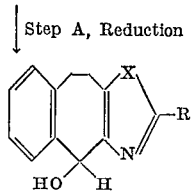
III

Step B, Halogenation

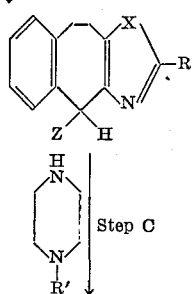
IV

Step C

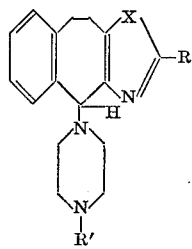
V

I

In the above reaction scheme, Step A is a reduction of a Compound II, i.e. to a 2-alkyl-9,10-dihydro-4H-benzo[5,6]cyclohepta[1,2-d]oxazol-4-one or thiazol-4-one to its corresponding Compound III, i.e. to a 2-alkyl-4 - hydroxy - 9,10 - dihydro-4H-benzo[5,6]cyclohepta-[1,2-d]oxazole or thiazole. The reduction may be carried out by conventional means for reducing a cycloalkyl ketone to a cycloalkanol, e.g., by treatment with sodium borohydride in an inert organic solvent conventionally used therefor, e.g. a lower alkanol, such as ethanol, or a cyclic ether such as tetrahydrofuran, at from about −20 to +80° C., e.g. from about −5° to +10° C., preferably at about 0° C.

Step B is the halogenation of a Compound III to its corresponding Compound IV, i.e. to a 2-alkyl-4-halo-9,10-dihydro-4H-benzo[5,6]cyclohepta-[1,2-d]oxazole or thiazole. The halogenation is carried out by treatment with a halogenating agent conventionally employed for converting a secondary alkyl alcohol to a secondary alkyl chloride or bromide, e.g. thionyl chloride, thionyl bromide, phosphorous trichloride or phosphorous tribromide, at temperature of from about −5° to +35° C., preferably at from −5° to +5° C., in an inert organic solvent e.g. toluene or xylene. Excess halogenating agent may serve as solvent, where liquid under the reaction conditions.

Step C is the amination of a Compound IV with a Compound V, i.e. a 4-substituted piperazine. Step C may be carried out in the conventional manner for converting an alkyl halide to an alkylamine. For example, in carrying out the amination reaction the amine (Compound V) is carefully admixed with the halogenated intermediate (Compound IV), with cooling, e.g. at from about −5° to +15° C., then the reaction mixture is allowed to warm, e.g. up to about 30° C., and the reactants maintained in contact until a significant amount of Compound I is formed. A byproduct of the reaction of Compounds IV and V is a hydrogen halide, i.e. HZ, (Z being as defined above) and a portion of the Compound V utilized, (being a base) is consumed in neutralizing the hydrogen halide formed, unless an acid binding agent is employed. However, it is preferred to employ excess Compound V. Compounds I are basic, and may be recovered in the conventional manner for recovering a basic organic compound from a reaction mixture, e.g. by extraction from alkalized reaction mixture.

Compound I may be conveniently handled and administered in the form of their non-toxic pharmaceutically acceptable acid addition salts, as described hereinafter.

Compounds II are obtainable by procedures as described in the literature, e.g. Netherlands Pats. 6714710 (published May 6, 1968) and 6806421 (published Nov. 18, 1968).

In Compounds I the 4-carbon atom, i.e. the carbon atom bearing the 4′-substituted-piperazinyl function, is an asymmetric center; hence, Compounds I exist as optical isomers. The respective isomers can be separated by conventional means, e.g. by use of optically active acids, and accordingly are within the scope of this invention.

The compounds of Formula I possess pharmacological activity. In particular, such compounds possess tranquillizing activity and are useful as minor tranquillizers, as can be demonstrated in conventional tests, for example, by effecting docility in the behavior test in mice and/or in the shock-induced fihting mice test (J. Pharm. Exp. Therap. 125:28–34, 1969). The dosage of the Compounds I employed for said tranquillizing use may vary depending on the particular compound employed and the severity of the condition being treated. However, in general, satisfactory results are obtained when the Compounds I are administered at a daily dosage of from about 1.0 milligrams to about 200 milligrams per kilogram of animal body weight per os, preferably given in divided doses two to four times a day, or in sustained release form. For most large mammals, the total daily dosage is from about 70 milligrams to about 1500 milligrams per os. Dosage forms suitable for oral administration comprise from about 18 milligrams to about 750 milligrams of the active compound in intimate admixture with a solid or liquid pharmaceutically acceptable carrier or diluent.

The compound of Formula I wherein X is oxygen and R and R′ are each methyl is of particular interest, as it also possesses antidepressant activity, as is demonstrated in animal tests such as those conventionally employed in testing for antidepressant activity, e.g. the ability to reverse reserpine-induced hypothermia in mice and/or antagonize tetrabenazine-induced catalepsy in rats. The compound is useful in treating mental depression in the same manner as amitriptyline, a known psychotherapeutic drug, and can be administered internally in the same manner as amitriptyline, and appropriate dosage forms can be prepared accordingly. The dosage of such compound when employed as antidepressant may vary depending on the severity of the condition being treated. However, in general, satisfactory results are obtained when the compound is administered at a daily dosage of from about 0.15 milligram to about 100 milligrams per kilogram of animal body weight per os, preferably given in divided doses two to four times a day, or in sustained release form. For most large mammals, the total daily dosage is from about 8 to about 500 milligrams per os. Dosage forms suitable for internal use comprise from about 2.0 to about 250 milligrams of the active compound in intimate admixture with a solid or liquid pharmaceutically acceptable carrier or diluent. For example, particularly convenient dosage forms for the compound of Example 1, hereinafter, are capsules and tablets containing 2, 5, 10 or 25 milligrams of active ingredient, and injectable solutions containing 10 milligrams of active ingredient per cubic centimeter of solution. As is well-understood in the art, oral administration is preferred, and parenteral administration, while available, is utilized principally in instances where rapid onset of action is desired. Parenteral dosages for the above-described uses are about one fifth those of oral dosages given above, and are preferably administered in unit doses which range from the lowest oral dosage unit to a maximum practical limit, e.g. a maximum of 40 mg.

For the above-mentioned uses, Compounds I may be administered in either the free base form or as non-toxic pharmaceutically acceptable acid addition salts thereof. Such salt forms possess the same order of activity as the free base forms and are readily prepared in the conventional manner, e.g. by reacting the free base form with an appropriate acid and accordingly are included within the scope of the invention. Such salt forms include, e.g. the hydrochloride, hydrobromide, sulfate, phosphate, acetate, citrate, fumarate, tartrate and p-toluenesulfonate salts.

Compounds I in the free base or salt form, may be administered for the above-mentioned uses orally in such forms as tablets, capsules, elixirs, suspensions and the like, or parenterally in the form of an injectable solution or suspension. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g. inert diluents such as calcium carbonate, sodium carbonate, lactose and talc, granulating and disintegrating agents, e.g. starch and alginic acid, binding agents, e.g. starch gelatin and acacia, and lubricating agents, e.g. magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g. suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g. calcium carbonate, calcium phosphate and kaolin. The preferred pharmaceutical compositions from the standpoint of preparation and ease of administration are solid compositions, particularly hard-filled capsules and tablets.

The following examples are presented as illustrative of this invention and not intended as in any way limiting the scope of this invention. All temperatures are centigrade and room temperature is 25° C., unless indicated otherwise.

EXAMPLE 1

2-methyl-4-(4'-methyl-1'-piperazinyl)-9,10-dihydro-4H-benzo[5,6]cyclohepta[1,2-d]oxazole

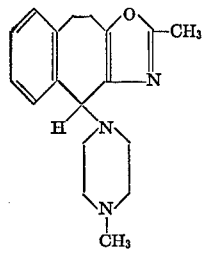

Step A.—4-hydroxy-2-methyl-9,10-dihydro-4H-benzo[5,6]cyclohepta[1,2-d]oxazole:

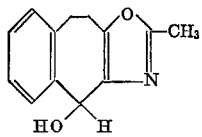

To a solution of 120 g. of 2-methyl-9,10-dihydro-4H-benzo[5,6]cyclohepta[1,2-d]oxazol-4-one, in 800 ml. of methylene dichloride and 1200 ml. of absolute ethanol, stirred at 0°, there is added spoonwise 40 g. of sodium borohydride. Stirring is continued for 3 hours; then, 3 liters of ice-water is added and the methylene chloride layer is separated, dried over sodium sulfate, and evaporated (under vacuum) to give the crude 4-hydroxy-2-methyl-9,10-dihydro - 4H - benzo[5,6]cyclohepta[1,2-d]oxazole; M.P. 126 to 130°, after recrystallization from ethyl acetate, M.P. 132 to 135°.

Step B.—4-chloro - 2 - methyl-9,10-dihydro-4H-benzo[5,6]cyclohepta[1,2-d]oxazole:

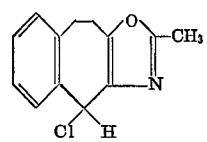

120 g. of the 4-hydroxy-2-methyl-9,10-dihydro-4H-benzo[5,6]cyclohepta[1,2-d]oxazole (obtained in Step A, above) dissolved in 1200 ml. of toluene at 0°, is dropwise treated with 66.5 g. of thionyl chloride. On standing for 16 hours at 0°, 2-methyl-4-chloro-9,10-dihydro-4H-benzo[5,6]cyclohepta[1,2-d]oxazole crystallizes, is filtered off and washed with cold toluene, M.P. 68 to 70° (dec.).

Step C.—2-methyl-4-(4'-methyl-1'-piperazinyl)-9,10-dihydro-4H-benzo[5,6]cyclohepta[1,2-d]oxazole: To a suspension of 4-chloro-2-methyl-9,10-dihydro-4H-benzo[5,6]cyclohepta[1,2-d]oxazole (crude product obtained in Step B, above) (130 g.) in 1300 ml. of toluene, at 0° with stirring, 320 g. of N-methylpiperazine is added dropwise (over a period of about 120 minutes). The mixture is allowed to stand at room temperature (25°) for 16 hours. 600 ml. of 1 N aqueous sodium hydroxide solution is then added to the reaction mixture and the biphasic mixture concentrated in vacuo to obtain a residue. The residue is taken up in 600 ml. of benzene and extracted with a total of 1000 ml. of 3 molar aqueous acetic acid. The acetic acid solution is poured into 1 liter of 5 N sodium hydroxide solution. The product is then extracted thrice with 300 ml. portions of benzene. The crude product obtained on evaporation of the benzene solution is purified by short-path distillation (bath temp. 130°, pressure 0.01 mm.). On trituration with ether the crystalline 2-methyl-4 - (4'-methyl-1'-piperazinyl)-9,10-dihydro-4H-benzo[5,6]cyclohepta[1,2-d]oxazole, M.P. 114 to 117°, is obtained.

The crystalline bis-fumaric salt of 2-methyl-4-(4'-methyl-1' - piperazinyl)-9,10-dihydro-4H-benzo[5,6]cyclohepta[1,2-d]oxazole is prepared by heating a mixture of 169 g. of 2 - methyl-4-(4'-methyl-1'-piperazinyl)-9,10-dihydro-4H-benzo[5,6]cyclohepta[1,2-d]oxazole (free base), 132 g. of fumaric acid and 850 ml. of isopropyl alcohol. On cooling, the bis-fumaric salt, M.P. 175 to 178°, crystallizes.

EXAMPLE 2

2-methyl-4-(4'-methyl-1'-piperazinyl)-9,10-dihydro-4H-benzo[5,6]cyclohepta[1,2-d]thiazole

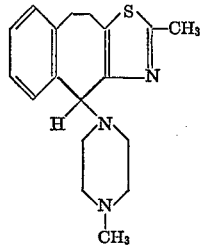

Step A.—4-hydroxy-2-methyl-9,10-dihydro-4H-benzo[5,6]cyclohepta[1,2-d]thiazole:

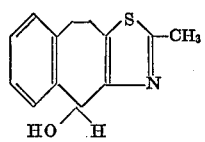

Following the procedure described in Step A of Example 1, but replacing the 2-methyl-9,10-dihydro-4H-benzo[5,6]cyclohepta[1,2-d]oxazol-4-one with an equivalent amount of 2-methyl-9,10-dihydro-4H-benzo[5,6]cyclohepta[1,2-d]thiazol-4-one, 4-hydroxy-2-methyl-9,10-dihydro-4H-benzo[5,6]cyclohepta[1,2-d]thiazole is obtained, M.P. 147 to 149°.

Step B.—4-chloro-2-methyl-9,10-dihydro-4H-benzo[5,6]cyclohepta[1,2-d]thiazole:

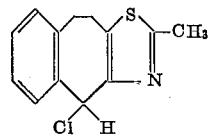

Following the procedure described in Step B of Example 1, but replacing the 4-chloro-2-methyl-9,10-dihydro-4H-benzo[5,6]cyclohepta[1,2-d]oxazole with an equivalent amount of 4-hydroxy-2-methyl-9,10-dihydro-4H-benzo[5,6]cyclohepta[1,2-d]thiazole, 4-chloro-2-methyl-9,10-dihydro-4H-benzo[5,6]cyclohepta[1,2-d]thiazole is obtained, M.P. 135 to 165° (dec.).

Step C.—2-methyl-4-(4'-methyl-1'-piperazinyl)-9,10-dihydro-4H-benzo[5,6]cyclohepta[1,2-d]thiazole: Following the procedure described in Step C of Example 1, but replacing the 4-chloro-2-methyl-9,10-dihydro-4H-benzo[5,6]cyclohepta[1,2-d]oxazole with an equivalent amount of 4-chloro-2-methyl-9,10-dihydro-4H-benzo[5,6]cyclohepta[1,2-d]thiazole, 2 - methyl - 4 - (4'-methyl-1'-piperazinyl) - 9,10 - dihydro - 4H-benzo[5,6] cyclohepta[1,2-d]thiazole is obtained, as the free base, M.P. from ether 154° to 156° C.

EXAMPLE 3

2-methyl-4-[4'-(β-hydroxyethyl)-1'-piperazinyl]-9,10-dihydro-4-H-benzo[5,6]cyclohepta[1,2-d]oxazole

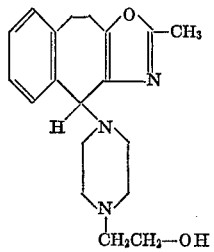

Following the procedure of Step C of Example 1 but replacing the 4-methylpiperazine with an equivalent amount of β-hydroxyethylpiperazine, 2-methyl-4-[4'-(β-hydroxyethyl) - 1' - piperazinyl]-9,10-dihydro-4H-benzo[5,6]cyclohepta[1,2-d]oxazole is obtained.

Following the procedure of this example, but replacing the 4-chloro-2-methyl-9,10-dihydro-4H-benzo[5,6]cyclohepta[1,2-d]oxazole with an equivalent amount of 4-chloro - 2 - methyl-9,10-dihydro-4H-benzo[5,6]cyclohepta[1,2-d]thiazole, 2-methyl-4-[4'-(β-hydroxyethyl)-1'-piperazinyl] - 9,10 - dihydro - 4H-benzo[5,6]cyclohepta[1,2-d]thiazole is obtained.

EXAMPLE 4

2-isopropyl-4-(4'-methyl-1'-piperazinyl)-9,10-dihydro-4H-benzo[5,6]cyclohepta[1,2-d]oxazole (A) 4-hydroxy-2-isopropyl-9,10-dihydro-4H-benzo[5,6]cyclohepta[1,2-d]oxazole: Following the procedure described in Example 1, Step A, but replacing the 2-methyl-9,10 - dihydro - 4H-benzo[5,6]cyclohepta[1,2-d]oxazol-4-one with an equivalent amount of 2-isopropyl-9,10-dihydro - 4H - benzo[5,6]cyclohepta[1,2-d]oxazol-4-one (M.P. 73–76° C., crystallized from heptane), 4-hydroxy-2-isopropyl-9,10-dihydro-4H-benzo[5,6]cyclohepta[1,2-d]oxazole is obtained.

(B) 4-chloro-2-isopropyl-9,10-dihydro-4H-benzo[5,6]cyclohepta[1,2-d]oxazole: Following the procedure described in Example 1, Step B, but replacing the 4-hydroxy-2 - methyl - 9,10-dihydro-4H-benzo[5,6]cyclohepta[1,2-d]oxazole with an equivalent amount of 4-hydroxy-2-isopropyl - 9,10 - dihydro - 4H-benzo[5,6]cyclohepta[1,2-d]oxazole, 4-chloro-2-isopropyl-9,10-dihydro-4H-benzo[5,6]cyclohepta[1,2-d]oxazole is obtained.

(C) 2 - isopropyl - 4-(4'-methyl-1'-piperazinyl)-9,10-dihydro-4H-benzo[5,6]cyclohepta[1,2-d]oxazole: Following the procedure described in Example 1, Step C, but replacing the 4-chloro-2-methyl-9,10-dihydro-4H-benzo[5,6]cyclohepta[1,2-d]oxazole with an equivalent amount of 4-chloro-2-isopropyl-9,10-dihydro-4H-benzo[5,6]cyclohepta[1,2-d]oxazole,
2-isopropyl-9,10-dihydro-4H-benzo[5,6]cyclohepta[1,2-d]oxazole,
2-isopropyl-4-(4'-methyl-1'-piperazinyl)-9,10-dihydro-4H-benzo[5,6]cyclohepta[1,2-d]oxazole,
2-isopropyl-4-(4'-methyl-1'-piperazinyl)-9,10-dihydro-4H-benzo[5,6]cyclohepta[1,2-d]oxazole is obtained.

The difumarate salt form, i.e. the bis-fumarate of 2-isopropyl - 4 - (4' - methyl-1'-piperazinyl)-9,10-dihydro-4H-benzo[5,6]cyclohepta[1,2-d]oxazole, is prepared in a manner analogous to that described in Example 1(C) (crystallized from isopropanol-diethylether; 1:1 by volume), M.P. 158.5°.

EXAMPLES 5 AND 6

Tablets and capsules suitable for oral administration

Tablets and capsules containing the ingredients indicated below may be prepared by conventional techniques and are useful in treating mental depression at a dose of one tablet or capsule 2 to 4 times a day.

| Ingredient | Weight (mg.) | |
|---|---|---|
| | Tablet | Capsule |
| 2-methyl-4-(4'-methyl-1'-piperazinyl)-9,10-dihydro-4H-benzo[5,6]cyclohepta[1,2-d]oxazole, bis-fumarate salt | 25 | 25 |
| Tragacanth | 10 | |
| Lactose | 222.5 | 275 |
| Corn starch | 25 | |
| Talcum | 15 | |
| Magnesium stearate | 2.5 | |
| Total | 300 | 300 |

EXAMPLES 7 AND 8

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of mental depression. The injectable suspension and oral liquid suspension are suitably administered 2 to 4 times per day for this purpose.

| Ingredients | Weight (mg.) | |
|---|---|---|
| | Sterile injectable suspension | Oral liquid suspension |
| 2-methyl-4-(4'-methyl-1'-piperazinyl)-9,10-dihydro-4H-benzo[5,6]cyclohepta[1,2-d]oxazole, bis-fumarate salt | 10 | 25 |
| Sodium carboxy methyl cellulose, U.S.P. | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | q.s. |
| Color | | q.s. |
| Methyl paraben, U.S.P. | | 4.5 |
| Propyl paraben, U.S.P. | | 1.0 |
| Polysorbate 80 (e.g. Tween 80) U.S.P. | | 5 |
| Sorbitol solution, 70%, U.S.P. | | 2,500 |
| Buffer agent to adjust pH for desired stability | q.s. | q.s |
| Water | (¹) | (²) |

¹ For injection, q.s. to 1 ml.
² Q.s. to 5 ml.

NOTE.—q.s. = quantity sufficient.

What is claimed:

1. An internally administrable pharmaceutical composition suitable for use as a minor tranquillizer comprising as an active ingredient thereof an amount of a compound which is a free base of the formula:

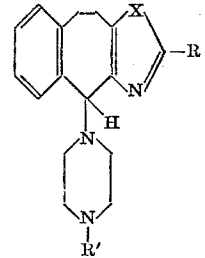

wherein

X is either oxygen or sulfur;
R is alkyl having from one to four carbon atoms; and
R' is alkyl having from one to two carbon atoms which may be unsubstituted or ω-hydroxy-substituted when having two carbon atoms;

or a non-toxic pharmaceutically acceptable acid addition salt of said free base, effective as a minor tranquillizer and a pharmaceutically acceptable carrier or diluent.

2. A composition of claim 1 wherein the carrier or diluent is solid.

3. A composition of claim 2 wherein the compound is present in an amount of from about 18 milligrams to 750 milligrams.

4. A composition of claim 3 wherein X is oxygen.

5. A composition of claim 4 wherein R is methyl.

6. A composition of claim 5 wherein R' is methyl.

7. A composition of claim 6 wherein the compound is a non-toxic pharmaceutically acceptable acid addition salt.

8. A composition of claim 7 wherein the compound is 2-methyl - 4 - (4'-methyl - 1' - piperazinyl)-9,10-dihydro-4H-benzo[5,6]cyclohepta[1,2-d]oxazole bis-fumarate salt.

9. An internally administerable pharmaceutical composition suitable for use as an antidepressant comprising as an active ingredient thereof an amount of a compound which is a free base of the formula:

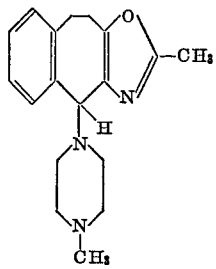

or a non-toxic pharmaceutically acceptable acid addition salt of said free base, effective as an antidepressant and a pharmaceutically acceptable carrier or diluent.

10. A composition of claim 9 wherein the carrier or diluent is solid.

11. A composition of claim 10 wherein the compound is present in an amount of from about 2 milligrams to 250 milligrams.

12. A composition of claim 11 wherein the compound is a non-toxic pharmaceutically acceptable acid addition salt.

13. A composition of claim 12 wherein the compound is 2-methyl - 4 - (4' - methyl - 1' - piperazinyl)-9,10-dihydro - 4H - benzo[5,6]cyclohepta[1,2-d]oxazole bisfumarate salt.

14. A method for obtaining a minor tranquillizing effect in an animal which comprises internally administering to said animal a tranquillizing amount of a compound which is a free base of the formula:

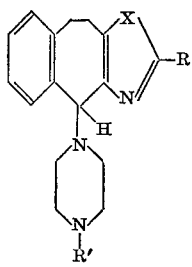

wherein

X is either oxygen or sulfur,
R is alkyl having from one to four carbon atoms; and
R' is alkyl having from one to two carbon atoms which may be unsubstituted or ω-hydroxy-substituted when having two carbon atoms;

or a non-toxic pharmaceutically acceptable acid addition salt of said free base.

15. A method of claim 14 wherein the compound is administered orally.

16. A method of claim 15 wherein the compound is administered in an amount of from about 70 milligrams to 1500 milligrams, daily.

17. A method of claim 16 wherein the compound is a non-toxic pharmaceutically acceptable acid addition salt.

18. A method of claim 17 wherein the compound is 2-methyl-4(4'-methyl - 1' - piperazinyl) - 9,10 - dihydro-4H-benzo[5,6]cyclohepta[1,2-d]oxazole bisfumarate salt.

19. A method for treating mental depression which comprises internally administering an antidepressive-effective amount of a compound which is a free base of the formula:

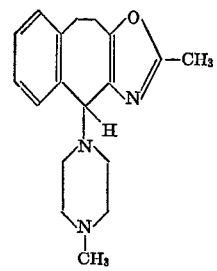

or a non-toxic pharmaceutically acceptable acid addition salt of said free base.

20. A method of claim 19 wherein the compound is administered orally.

21. A method of claim 20 wherein the compound is administered in an amount of from about 8 milligrams to 500 milligrams, daily.

22. A method of claim 21 wherein the compound is a non-toxic pharmaceutically acceptable acid addition salt.

23. A method of claim 22 wherein the compound is 2 - methyl - 4 - (4' - methyl - 1' - piperazinyl) - 9,10-dihydro - 4H - benzo[5,6]cyclohepta[1,2-d]oxazole bisfumarate salt.

References Cited
UNITED STATES PATENTS

| | | | |
|---|---|---|---|
| 3,442,903 | 5/1969 | Galantay | 260—302 |
| 3,485,846 | 12/1969 | Galantay | 260—293 |

STANLEY J. FRIEDMAN, Primary Examiner